Figure 12:
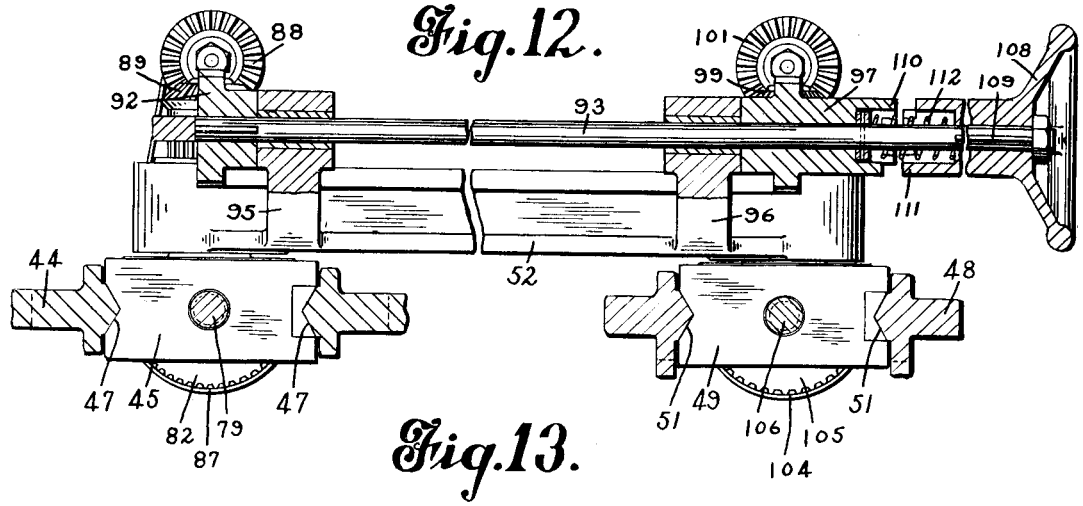

Feb. 16, 1932.　　　C. MOREY ET AL　　　1,845,172
ROLL GRINDING MACHINE
Filed March 4, 1927　　　7 Sheets-Sheet 1
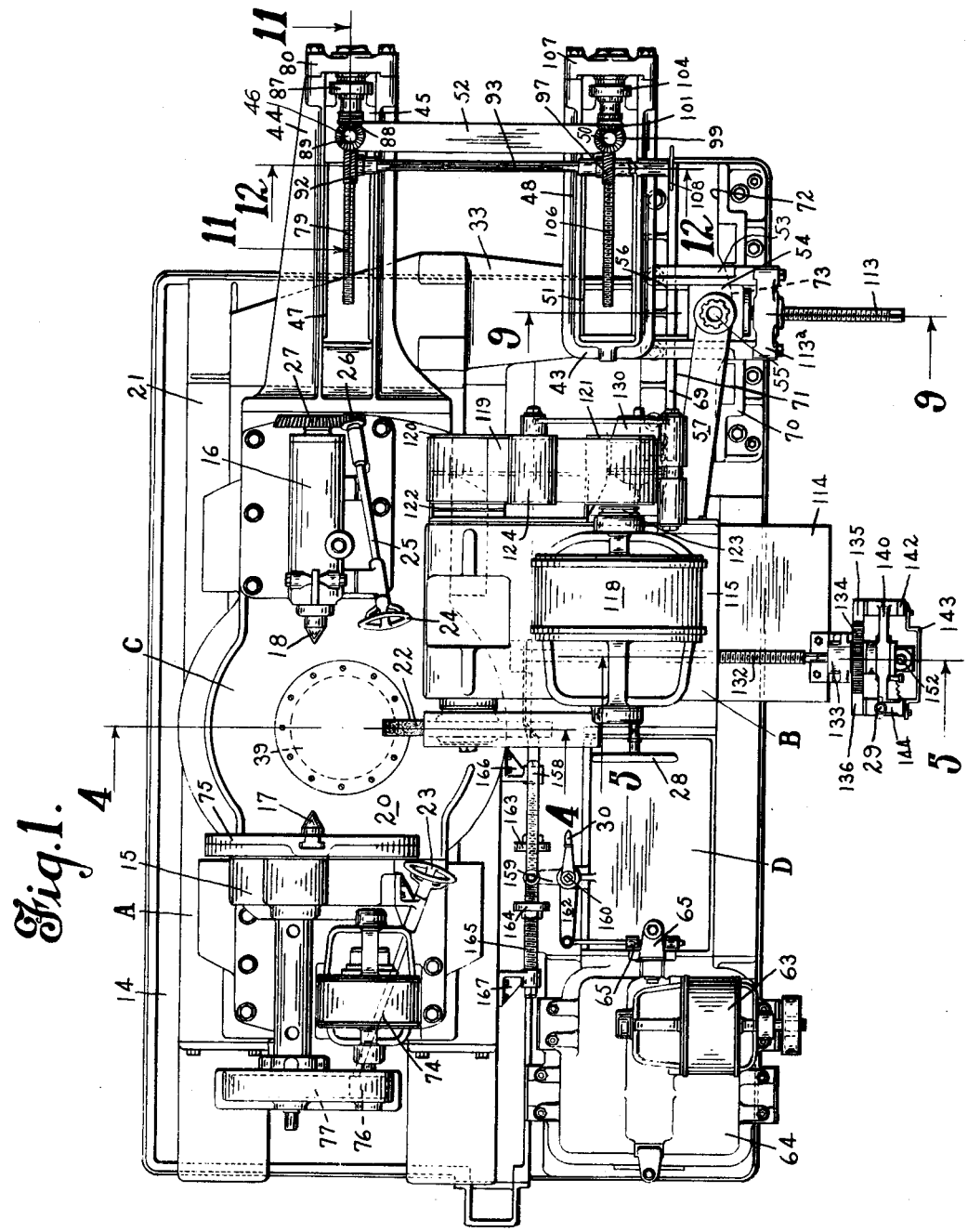
Inventor
Carl Morey and
Carl F. Schmick
By Rockwell + Bartholow
Attorneys

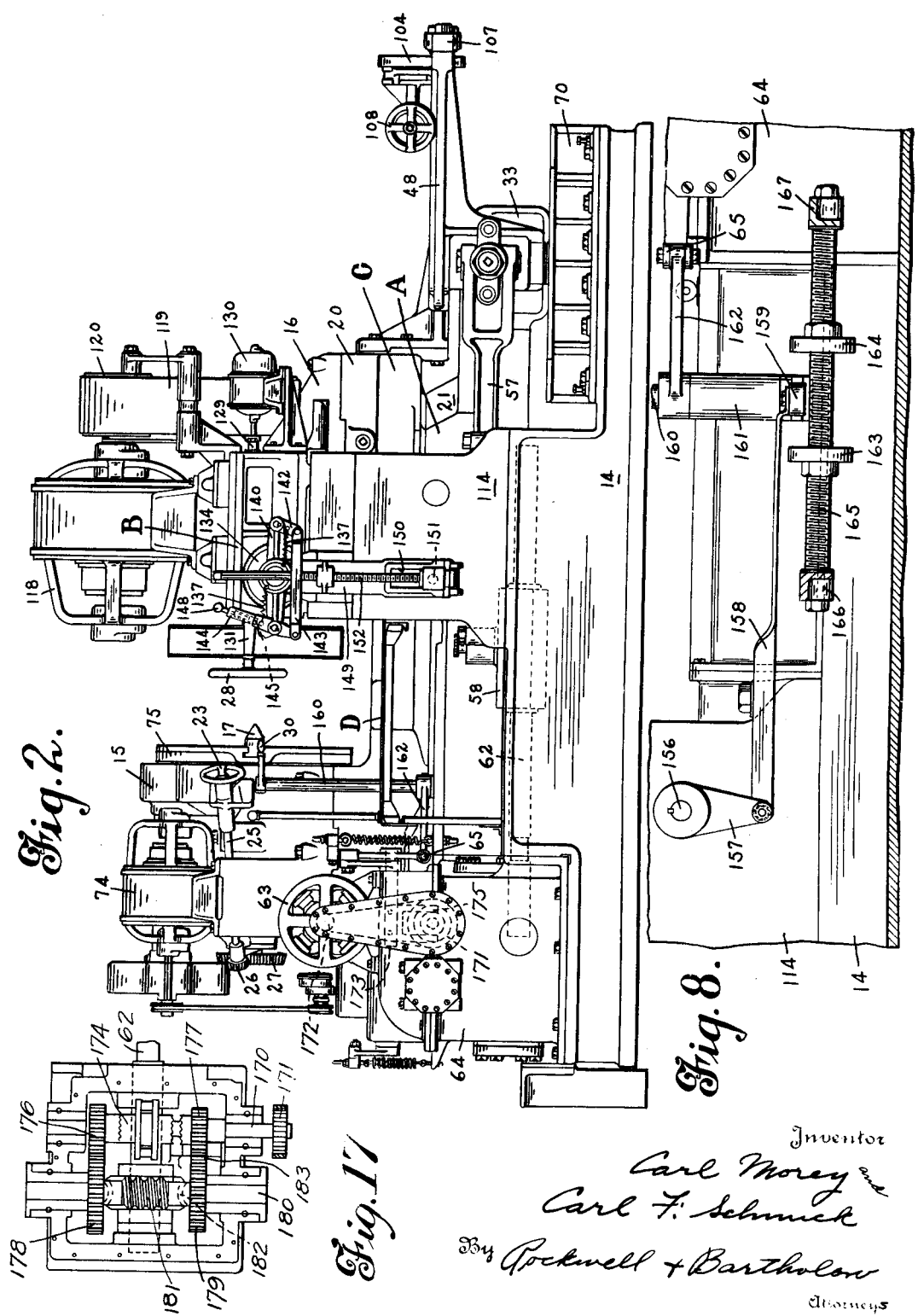

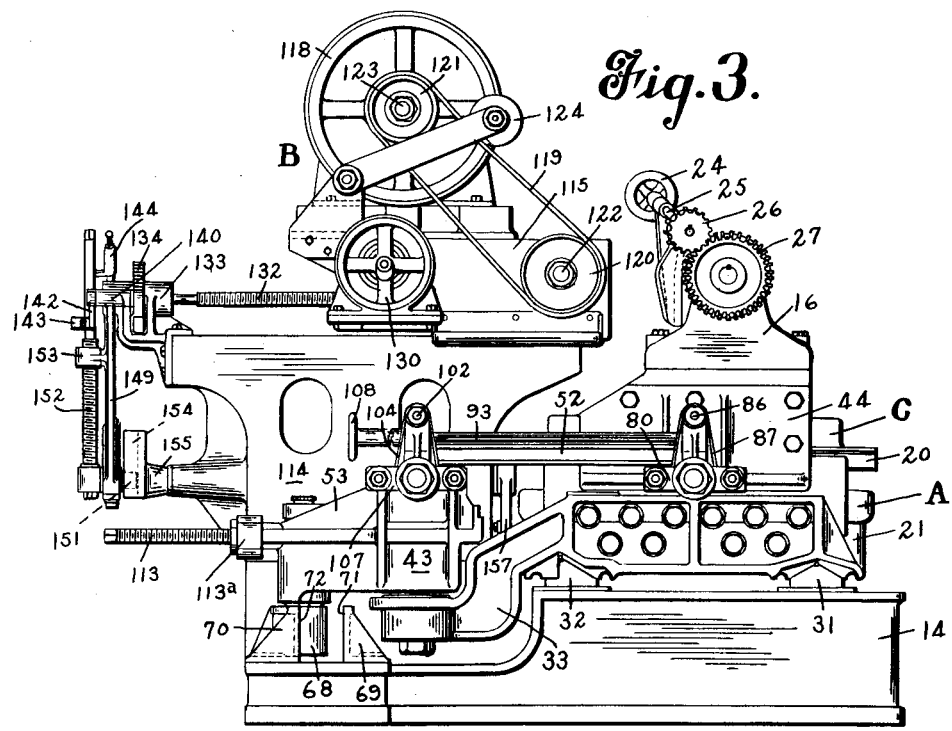
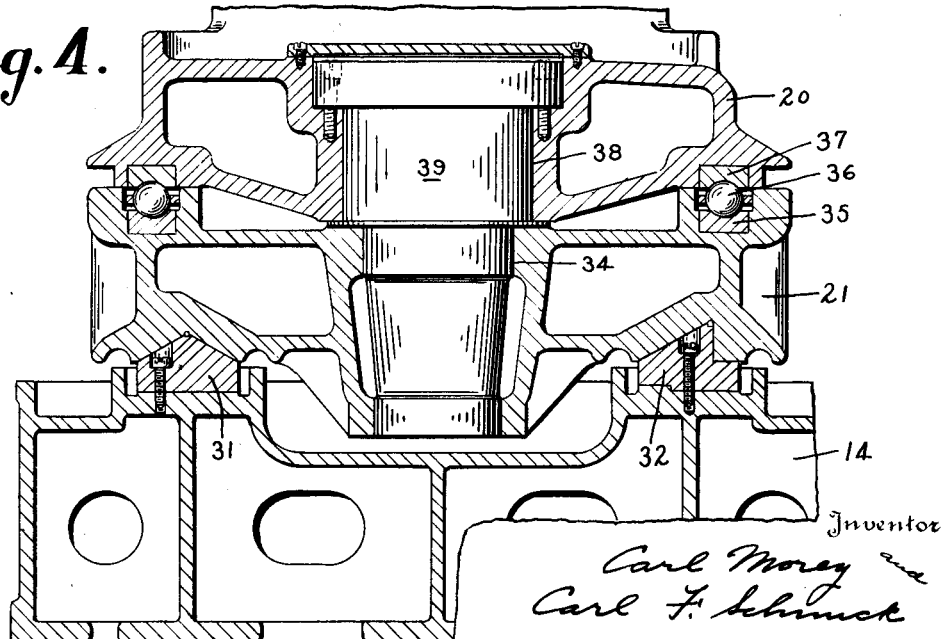

Feb. 16, 1932.   C. MOREY ET AL   1,845,172
ROLL GRINDING MACHINE
Filed March 4, 1927   7 Sheets-Sheet 4
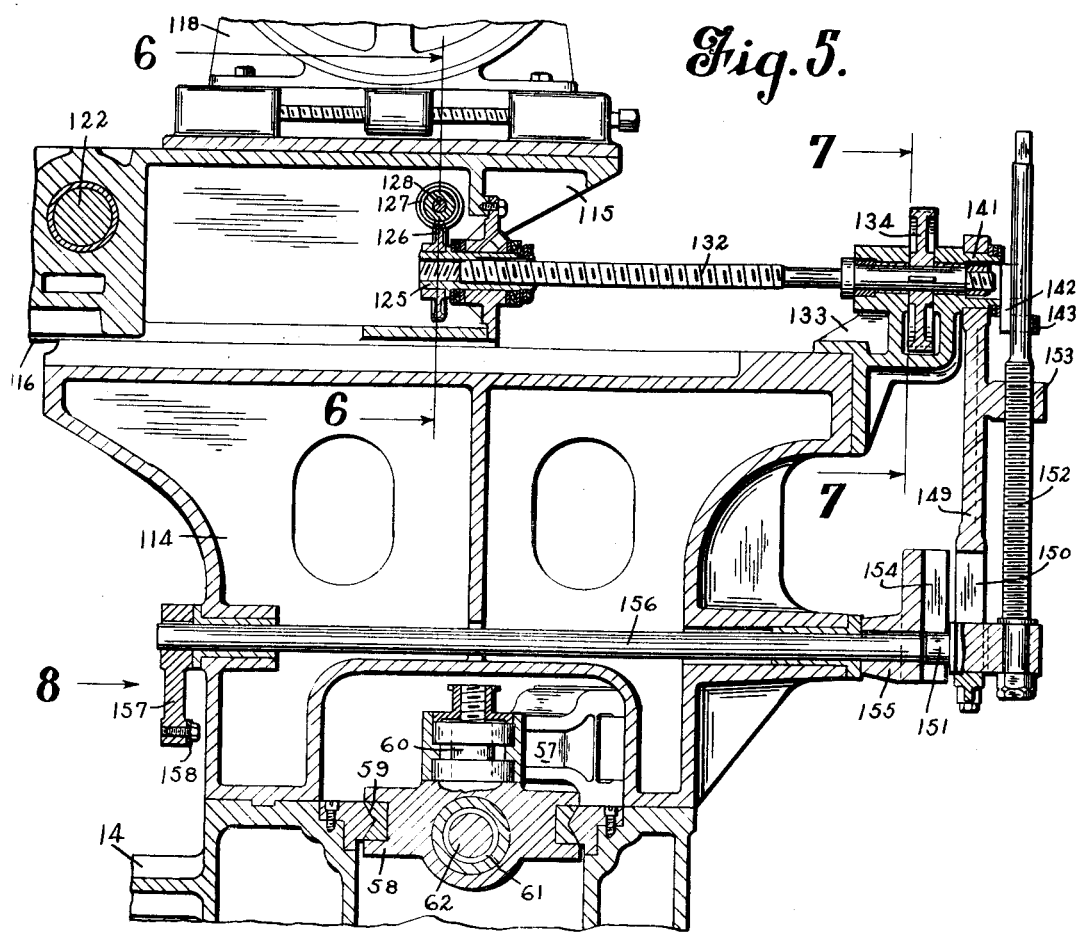
Fig. 5.
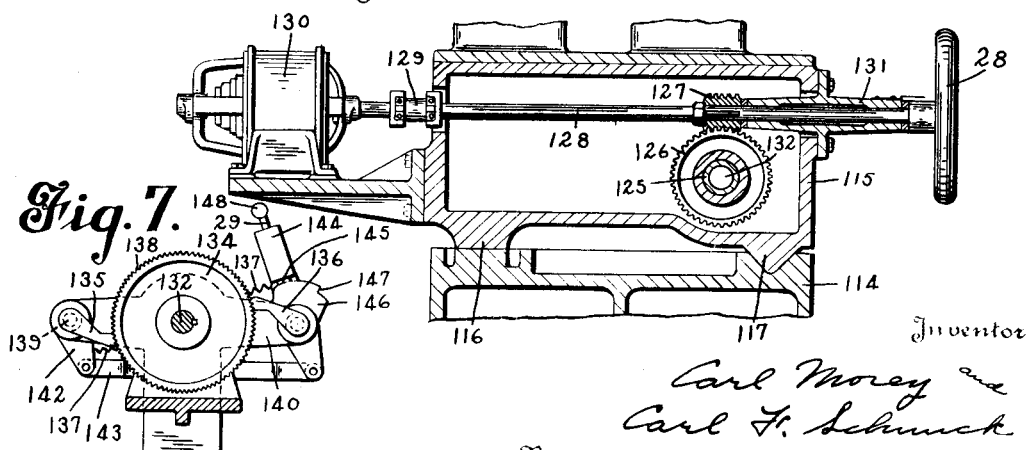
Fig. 6.
Fig. 7.
Inventor
Carl Morey and
Carl F. Schmuck
By Rockwell + Bartholow
Attorneys

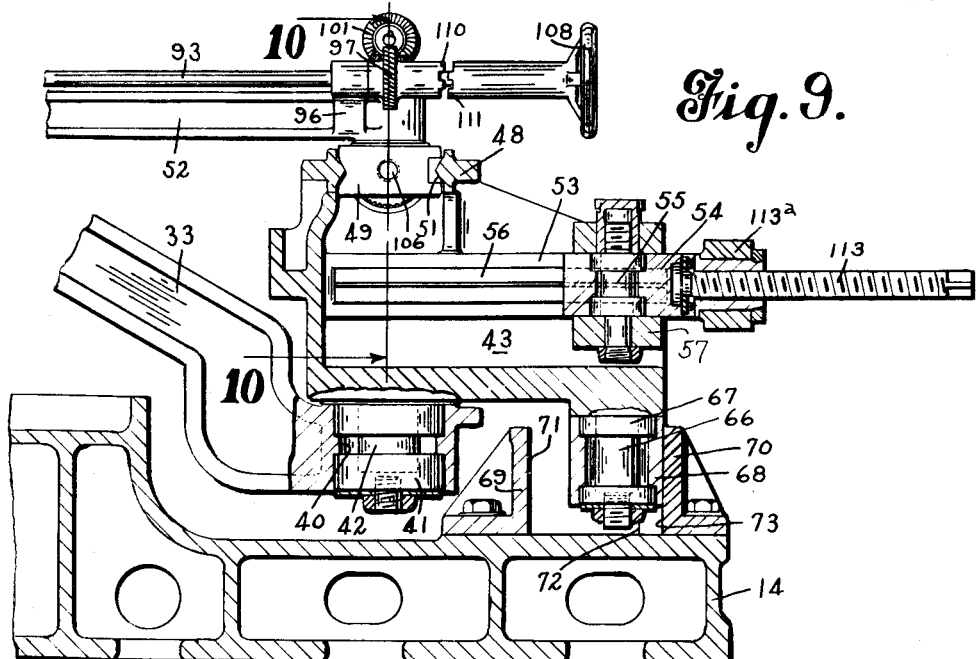
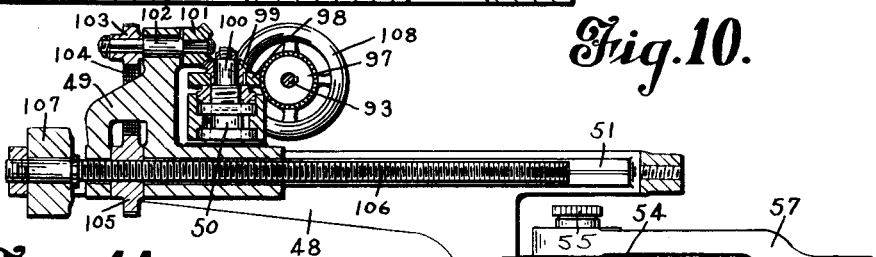
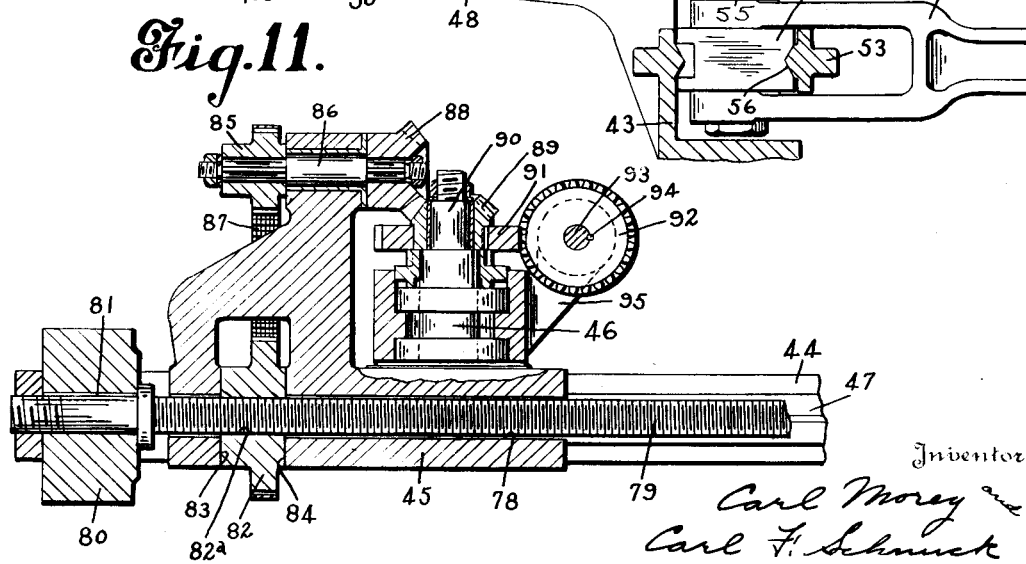

Feb. 16, 1932.   C. MOREY ET AL   1,845,172
ROLL GRINDING MACHINE
Filed March 4, 1927   7 Sheets-Sheet 6

Inventor
Carl Morey
Carl F. Schmick
By Bocknell & Bartholow
Attorneys

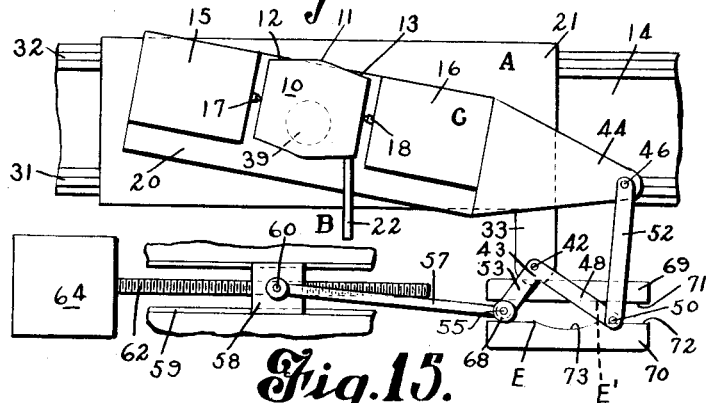
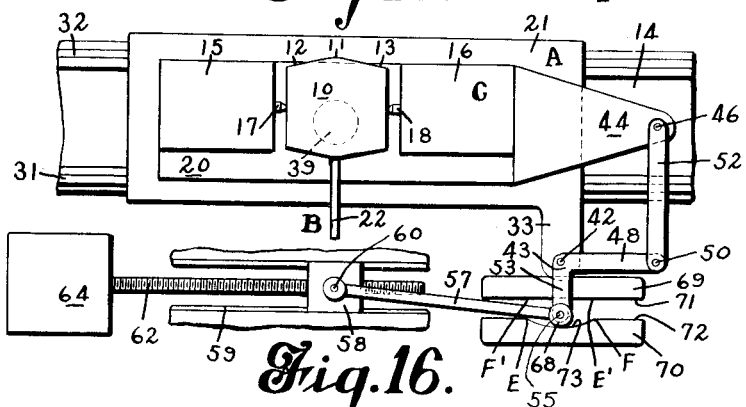
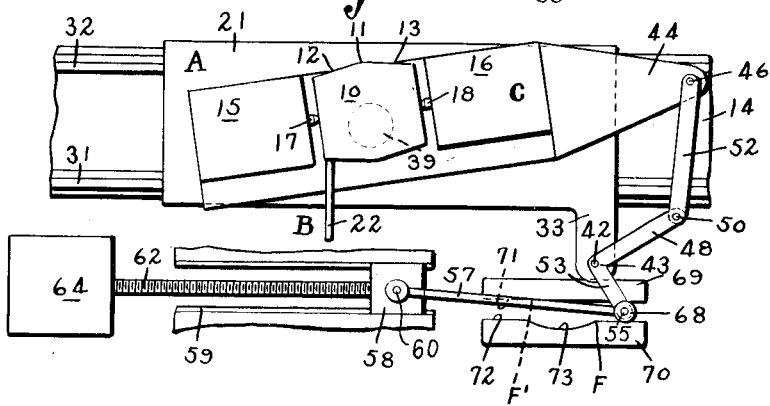

Patented Feb. 16, 1932

1,845,172

UNITED STATES PATENT OFFICE

CARL MOREY, OF ANSONIA, AND CARL F. SCHNUCK, OF NEW HAVEN, CONNECTICUT, ASSIGNORS, BY MESNE ASSIGNMENTS, TO FARREL-BIRMINGHAM COMPANY, INCORPORATED, OF ANSONIA, CONNECTICUT, A CORPORATION OF CONNECTICUT

ROLL GRINDING MACHINE

Application filed March 4, 1927. Serial No. 172,670.

This invention relates to roll grinding machines, and more particularly to roll grinding machines of a type adapted to grind the surface of rolls irregular in form, such as a roll having a combination of curved or angular surface portions with convex portions adjoining the same. Rolls of this character are used in large rolling mills for rolling I, angle and channel beams, particularly for shaping the channel form in I and channel beams. When used for this purpose, the roll, in some instances, is of substantially barrel shape having the periphery tapering towards the ends from an intermediate point and at an angle to the horizontal axis of the roll. At the intermediate point, it is occasionally desirable to provide a convex peripheral surface for interconnecting the angularly disposed ends. A roll of this character may be used to roll the flanges of an I or channel beam during the preliminary forming operations.

The principal object of this invention is to provide a roll grinding machine of such structure and combination of parts that a roll having an irregular peripheral surface may be efficiently ground thereby.

Another object of this invention is to provide in a roll grinding machine, suitable mechanism whereby the operation of grinding an irregularly surfaced roll will be substantially automatic.

A further object of this invention is to provide in a roll grinding machine, improved means for moving the roll blank relatively to the grinding wheel whereby an irregular contour upon the peripheral surface of the roll will be acted upon by the grinding wheel.

A still further object of this invention is to provide in a roll grinding machine, a rotatably-mounted reciprocating carriage, and means for reciprocating the carriage, including mechanism for rotating the same.

Further objects of this invention include the provision of automatically feeding the grinding wheel transversely toward the roll blank, novel adjusting means whereby the machine may be adapted to grind rolls having various surface contours, a novel lever system for operating a slidable roll supporting carriage whereby it may be successively moved parallel with the axis of the grinding wheel, laterally rotated relatively thereto and again moved parallel thereto, all of which movements are operatively driven by a common driving means, and a novel combination of these features whereby substantially automatic operation thereof is permitted.

To these and other ends, the invention consists in the novel features and combinations of parts to be hereinafter described and claimed.

Figure 13:
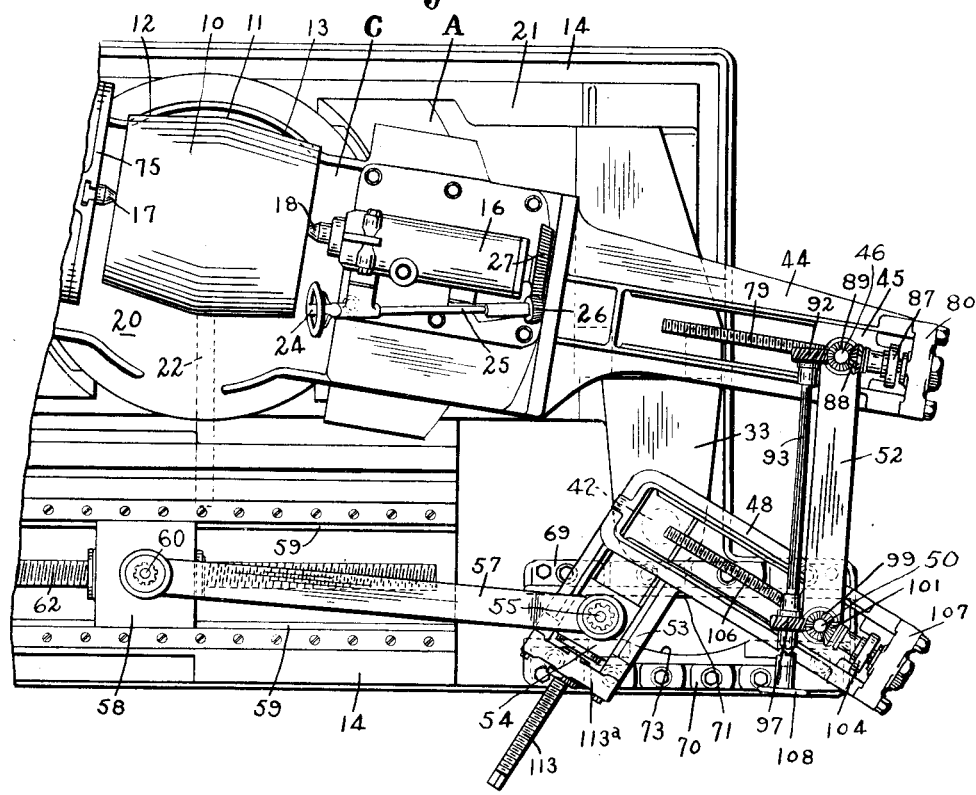

In the accompanying drawings:

Fig. 1 is a plan view of a machine, embodying the features of this invention;
Fig. 2 is a side elevation of the same;
Fig. 3 is an end elevation of the same;
Fig. 4 is a section on line 4—4 of Fig. 1;
Fig. 5 is a section on line 5—5 of Fig. 1;
Fig. 6 is a section on line 6—6 of Fig. 5;
Fig. 7 is a section on line 7—7 of Fig. 5;
Fig. 8 is a view taken in the direction of the arrow 8 of Fig. 5, showing the controls for reversing the reciprocating motion of the carriage;
Fig. 9 is a section on line 9—9 of Fig. 1;
Fig. 10 is a section on line 10—10 of Fig. 9;
Fig. 11 is a section on line 11—11 of Fig. 1;
Fig. 12 is a section on line 12—12 of Fig. 1;
Fig. 13 is a partial plan view of the machine, with certain of the operative parts thereof in another position certain parts having been removed for the sake of clearness,
Figs. 14, 15 and 16 are views of the machine of a more or less diagrammatic nature whereby the operation of the cooperating mechanisms thereof is illustrated, and
Fig. 17 is a plan view of the gear box with the cover thereof removed.

The machine selected to illustrate the features of this invention is one which is especially adapted to grind the peripheral surface of a substantially barrel-shaped roll 10. The roll 10 is formed with a convex portion 11 intermediate the ends thereof, and tapering end portions 12 and 13. The portions 12 and 13 are tapered from the convex portion where the roll is greatest in diameter towards the ends of the roll, which are of the smallest diameter. The taper of the portions 12 and 13, in this instance, are equal, straight, and merge with the curve of the convex portion 11 at a tangent thereto.

The machine illustrated, comprises the combination of a bed-plate 14, upon which is mounted reciprocable roll supporting means A, grinding wheel supporting means B, and means to reciprocate the roll supporting means C. A power driven head stock 15 and a tail-stock 16 are included in the roll supporting means, between which the roll 10 is supported upon suitable centers 17 and 18 of each, respectively. The head and tail stocks 15 and 16 respectively, are mounted upon a subbase 20. The subbase 20 is rotatably mounted for lateral swinging movement upon a carriage 21. The roll supporting means C, comprising the head and tail-stocks 15 and 16 respectively, the subbase 20, and the carriage 21 is slidably mounted upon the bed-plate 14 and is adapted to reciprocate thereon longitudinally with respect to the axis of the grinding wheel 22, and in a direction substantially parallel thereto.

A platform D is provided and is disposed relatively to the mechanisms comprising the machine, whereby an operator may be in position, when upon the platform, to readily control the operable parts thereof. Hand wheels 23 and 24, controlling respectively the centers 17 and 18 by means of the shaft 25 and gears 26 and 27, are disposed in position adjacent the operator upon the platform, to be readily reached thereby. A hand wheel 28 by which the grinding wheel may be manually moved toward the roll 10, is disposed within reach of this operator. A hand lever 29, controlling an automatic feed for feeding the grinding wheel 22 toward the roll 10, and a control bar 30 for reversing or stopping the reciprocation of the roll supporting means A, are also disposed within reach of the operator at the platform D. As the platform D is positioned relative to the wheel 22 and roll 10, so that the operator may readily observe the same and control the operation thereof without moving therefrom, substantially accurate and efficient results are obtained.

The carriage 21 is mounted upon longitudinally directed ways 31 and 32, secured upon the bed plate 14. A bracket 33 is secured to one end of the carriage 21 and extends generally transversely away therefrom. Intermediate the ends of the carriage 21, an opening 34 is provided, about which and concentric therewith an arcuate ball-bearing raceway 35 is disposed. A plurality of balls 36 are disposed in the raceway 35 and support the subbase 20 by engagement with a raceway 37 formed therein.

The subbase 20 is provided with an opening 38, which is concentric to the raceway 37 thereof, and is disposed in axial alignment with the opening 34 in the carriage 21. A pivot pin 39 is disposed within the openings 34 and 38, and forms the pivotal joint between the subbase 20 and the carriage 21, whereby the former may laterally swing or rotate with respect to the latter. The pivot pin 39 forms the sole connecting means between the subbase 20 and carriage 21.

The bracket 33 is provided with an opening 40 in the end thereof remote from said carriage. A suitable roller bearing 41 is provided in the opening 40 for a trunnion 42, which is secured to and depends from a bell crank 43, at the pivot point thereof. By this means, the carriage 21 is connected to the bell crank 43, the latter being laterally swingable relatively to the former while being movable longitudinally therewith.

A longitudinally extending bracket or extension 44 is secured upon the end of the swingable subbase 20. The bracket 44 supports a member 45, in which is mounted a pivot pin 46. The member 45, in this instance, is slidably mounted upon the bracket 44 between ways 47, extending longitudinally thereof. An arm 48 of the bell crank 43 supports a member 49, in which is mounted a pivot pin 50. The member 49, in this instance, is longitudinally slidable relatively to the arm 48, between ways 51 thereof. A connecting link or bar 52 extends between the members 45 and 49, and is pivoted to each by the respective pivot pins 46 and 50. By this connecting means between the bell crank 43 and the subbase 20, swinging or rotating movement of the former upon its trunnion 42 and with respect to the carriage 21, will be transmitted through the bar 52 to the subbase 20, causing the latter to swing about the pivot pin 39 and relatively to the carriage 21.

The other arm 53 of the bell crank 43 extends at substantially right angles to the arm 48 thereof, and is disposed in a plane parallel to but below the same. The arm 53 supports a member 54, which carries a pivot pin 55. The member 54 is slidably mounted in the arm 53 between ways 56 therein. A connecting bar or link 57 is pivoted to the member 54 by the pin 55, and extends away therefrom toward a cross head 58 slidably mounted between ways 59, secured upon the bed plate 14, and which extends longitudinally thereof. The bar 57 is pivotally connected to the cross head 58 by a pivot pin 60. The cross head 58 is provided with a threaded opening 61, the threads of which are engaged by the threads formed upon a feed screw 62.

The feed screw 62 is power driven by the motor 63, through suitable and any well-known arrangement of change speed gears, including a reverse mechanism for reversing the direction of rotation of the screw 62. The gearing is disposed within a casing 64, which is mounted upon the bed plate 14, in proper position for the use required thereof. A clutch lever 65 controlled by the control bar 30 is operative to stop the motion of the screw 62, or to provide rotation therefor in either direction by the association therewith of a clutch mechanism of any well known type suitable for this purpose.

The gear mechanism (see Fig. 17) which is disposed in the casing 64 in this instance, comprises a transverse shaft 170 upon the outer end of which is a chain belt pulley 171 which is drivingly connected to a pulley 172, secured upon the shaft of the motor 63 by means of a chain belt 173. A clutch sleeve 174 slidably keyed to the shaft 170 and engaged by clutch fingers 175, may be engaged with either of a pair of gear pinions 176 and 177 which are rotatably mounted upon the shaft 170. The clutch fingers 175 may be operated by the clutch lever 65. The pinion 176 is in mesh with a gear 178, and the pinion 177 in mesh with a gear 183 is in driving engagement with a gear 179. The gears 178 and 179 are secured to a shaft 180. A worm 181 is secured upon a shaft 180 and is in driving engagement with a worm wheel 182 which is secured to the feed screw 62. The provision of gear 183 intermediate the pinion 177 and the gear 179, provides reverse rotation of screw 62 when this is desired.

The arm 53 is provided with a trunnion 66 which, in this instance, extends downwardly from the outer end thereof toward the bed plate 14. The trunnion 66 supports a roller bearing 67 about which a roller 68 is free to rotate. A rear guide plate 69, and a front guide plate 70 is secured to the bed plate 14, below the roller 68, and are adapted to receive it therebetween. The plates 69 and 70 extend generally longitudinally of the bed plate and are spaced apart to form a longitudinally extending groove, the center line of which is substantially in parallel with the center line between the ways 59, and with the axis of the grinding wheel 22. The surface 71 of the rear guide plate 69 engaged by the roller 68 may be straight throughout the length of the plate, while the engaged surface 72 of the plate 70 is cut away intermediate the ends thereof as at 73 to form clearance, whereby the roller 68 is released from the confining action of the plates 69 and 70. This structure permits the disengagement of the roller 68 with this portion of the guide plate 70.

The operation of the mechanism above described, permits the grinding of the form of roll 10. These mechanisms are at the beginning of the cycle in the arrangement shown in Fig. 14. The carriage 21 is at its farthest position to the left relatively to the grinding wheel 22. The subbase 20 is swung to a position whereby the straight tapered surface 13 is engaged by the grinding wheel. The cross head 58 is at a position to the left, and the feed screw 62 is rotating to move the same to the right. Movement of the cross head to the right from the position shown in Fig. 14, through the bar 57, moves the roller 68 longitudinally with respect to the machine and parallel with the axis of the grinding wheel 22. The roller 68 is confined against movement other than in a straight line between the guide plates 69 and 70. This straight line movement is, therefore, transmitted through the arm 53, trunnion 42, and bracket 33 to the carriage 21, which slides longitudinally with respect to the machine on the ways 31 and 32. The carriage 21 during this movement, feeds the surface 13 of the roll 10 across the grinding wheel 22 in a path parallel to the axis thereof, whereby this surface may be accurately ground. This straight movement of the parts continues until the roller 68 substantially reaches the point where the cut away portion 73 at E, of the plate begins. At this period in the operation of the machine, movement of the carriage 21 toward the right is interrupted as the roller 68 is now not confined between the plates 69 and 70. The grinding wheel 22, however, is still in grinding engagement with the roll 10, being disposed at the beginning of the arcuate or convex surface 11 thereof. The bell crank 43 now swings or rotates about the pivot point formed by the trunnion 42, which action through the bar 52 secured to the arm 48 of the bell crank 43 and the bracket 44 on the swingable subbase 20, rotates the subbase with respect to the carriage 21 and with it the roll 10. During this rotation, see Fig. 15, the convex surface 11 is ground. When the bell crank 43 swings sufficiently to permit the roller 68 to engage the rear guide plate 69 at E', the swinging movement of all the swingable parts is interrupted. At this point, the guide plate 69 resists further swinging and the roller 68 is again confined between the plates 69 and 70, see Fig. 16. Further movement of the cross head 58 by the feed screw 62 toward the right, permits the grinding wheel to accurately grind the other straight tapered surface 12, the carriage 21 being moved toward the right and carrying with it the subbase 20 and roll 10. As soon as the grinding wheel 22 reaches the left end of the roll 10, the reverse mechanism automatically operates and the cross head 58 by action of the feed screw 62 is started toward the left.

During this cycle of machine operation, the confined roller 68 insures a straight movement of the parts until it reaches the straight surface interruption in the guide plate 70, at F. At this point, the roll 10 is swung in the reverse direction, the swinging movement being interrupted when the roller 68 engages the rear plate 69 substantially at F'. After the engagement of the roller with the rear plate at F', the parts are again moved in a straight line toward the left and parallel to the axis of the grinding wheel 22.

Suitable means is provided for rotating the roll 10, comprising the motor 74, mounted upon the head stock 15. The roll 10 is secured to a face plate 75, which is rotated by the motor 74 through gears 76 and 77.

The length of the leverage of the subbase extension or bracket 44 is adjustable. For this purpose, the member 45 carried thereby is adjustably slidable between the ways 47. The member 45 is provided with an opening 78 through which a screw 79 longitudinally extends. The screw 79 is secured to the end 80 of the bracket 44 by a key 81. A sprocket wheel 82, disposed between opposing shoulders 83 and 84 provided on the member 45, engages the threads of the screw 79 within the threaded opening 82$^a$ therein. Another sprocket wheel 85 is secured to an end of a horizontally disposed shaft 86 journaled in the member 45. A chain 87 drivingly connects the sprockets 82 and 85. A bevel gear 88 is mounted upon the other end of the shaft 86 and is in mesh with a bevel gear 89, rotatably mounted upon a vertical extension 90 of the pivot pin 46. Upon the hub of the bevel gear 89, a gear pinion 91 is secured to rotate therewith. A gear 92 meshes with the pinion 91, and is secured to a shaft 93 by a key 94. The shaft 93 is journaled at one end in an arm 95 formed upon one end of the bar 52 and at the other end in an arm 96 formed upon the bar 52 at the end thereof, adjacent arm 48 of the bell crank 43.

An arrangement of parts similar to that above described is provided upon the arm 48. A gear 97 is rotatably mounted upon shaft 93 and meshes with a gear 98 secured to a bevel gear 99, rotatable on an extension 100 of the pivot pin 50. A bevel gear 101 mounted upon the member 49, meshes with the gear 99 and through a shaft 102 drives a sprocket wheel 103. The wheel 103 is drivingly connected by a chain 104 to a sprocket wheel 105. The wheel 105 is provided with a threaded opening in which a screw 106 engages. The screw 106 is secured to the end 107 of the arm 48, and the wheel 105 is disposed between opposed shoulders provided on the member 49.

Rotation of the sprocket wheels 82 and 105 will move the respective members 45 and 49 in a direction depending upon the rotation thereof. The radius of the leverage of both the subbase 20, with its extension 44 from the pivot pin 39 thereof, and the arm 48 of the bell crank 43 from the pivot pin 42 thereof, may be varied by rotation of the respective gears 92 and 97. At the outer end of shaft 93, a hand wheel 108 is secured by a key 109 upon which the wheel may longitudinally slide. The hub of the gear 97 is provided with clutch teeth 110, which may be engaged by cooperating teeth 111, formed upon the end of the hub of the hand wheel 108. A spring 112 acts upon the hand wheel 108 to normally hold it in a poistion whereby the teeth 110 and 111 are out of engagement. Rotation of the hand wheel 108 will rotate gear 92 to vary the radius of the swinging subbase 20, and when the clutch teeth 110 and 111 are in engagement, both gears 92 and 97 are rotatable to vary the effective radius of the subbase 20 and the arm 48 in unison. By this arrangement, various combinations with respect to the radii of these parts is possible to vary the proportion in the amount of turning or swinging movement therebetween.

The effective radius of the bell crank arm 53 may also be varied by manipulation of a screw 113, which threadingly engages in an opening provided in the end 113$^a$, of the arm 53. The screw 113 is rotatably secured to the member 54. By rotation of the screw 113, the member 54 may be moved upon the ways 56. This movement will vary the radius between pivot pins 42 and 55, thus varying the proportion between the swinging movements of the bell crank 43 and the subbase 20. The provision of the above described adjustable features with respect to the effective radius of subbase 20, arms 48 and 53, and the bell crank 43, permits the grinding of rolls having varying surface contours. Variation in the radius of the arm 53 varies the speed of the travel of the grinding wheel 22 relatively to the convex surface 11 of roll 10. The extent of the surface 11 longitudinally of the roll 10 is determined by the included angle of the tapered ends 12 and 13. Where the surface 11 is longer in one case than in another case, the speed of the travel of the wheel 22 relatively to the same may be too rapid for efficient operation. This movement, therefore, should be reduced in speed. By decreasing the distance between the pivot pins 42 and 55, the arc described by the portion of arm 53 between these pivot pins is decreased in length, but the angle thereof remains the same. The included angle between the tapered ends 12 and 13 of roll 10, therefore, is not affected but as the length of the arc described by the portion of arm 53 is decreased and the interval of time during the swinging thereof remains constant, the roll mounted upon the subbase 20 swings about the pivot 39 at a decrease in speed. Variation in the radius of either or both the subbase 20 and the arm 48, varies the angle of the tapered ends 12 and 13 of roll 10. This variation in the angle of the tapered ends is caused by decrease or increase in throw produced by varying the length of either the distance between pivot point 39 and pivot pin 46, or the distance between pivot pin 42 and pivot pin 50, or both. If the distance between point 42 and point 50 is decreased, the arc described by point 50 will be lessened in length whereby the arc described by the point 46 will be lessened. The decreased movement thus occasioned by the lessening of the length of the arc described by the point 46 about the center 39 will decrease the angle of this arc and, therefore, increase the included angle between the tapered ends 12 and 13.

The grinding wheel support B includes a frame member 114, which is secured to the bed plate 14, and overlies the ways 59 thereof. Upon the member 114, a grinding wheel base 115 is mounted and adapted to transversely slide toward and away from the roll blank 10, on ways 116 and 117. A motor 118 is mounted upon the base 115, and by means of a belt 119 is drivingly connected to the wheel 22, through pulleys 120 and 121, secured upon the respective shafts 122 and 123 of the wheel and motor. An idler pulley 124, insures proper tension on the belt 119.

A cylinder nut 125 is rotatably mounted in a portion of the wheel base 115. Secured to an end of this nut is a worm wheel 126 which rotates therewith. In mesh with the worm wheel 126 is a worm 127, secured to a shaft 128, the axis of which, in this instance, is at right angles to the axis of the nut 125. The hand wheel 28 is secured to one end, and by means of a coupling 129 the motor 130 is connected to the other end of shaft 128. The shaft 128 is journaled in a bracket 131, secured to the base 115.

A screw 132, the threads of the free end of which engage the threads within the nut 125, is journaled at the other end in a bracket 133, secured to the frame 114. A ratchet wheel 134 is keyed to the screw 132 and disposed between opposed shoulders of the bracket. A pair of pawls 135 and 136 are disposed one on either side of the ratchet wheel 134, and are adapted to engage the same by the cooperation of the teeth of each with the teeth 138 formed on the periphery of the wheel 134. A spring 137 engages each pawl to urge it toward the ratchet wheel 134, and to insure the engagement of the teeth thereof. The wheel base 115 will move transversely with respect to the bed plate 14, when the nut 125 is rotated by means of either the hand wheel 28 or the motor 130, the pawls 135 and 136 retaining the screw 132 against rotation in either direction when in engagement with the ratchet wheel 134. Rotation of the ratchet wheel 134 will likewise move the base 115, the worm 127 and worm wheel 126, in this event, retaining the nut 125 against rotation.

The pawls 135 and 136 are each secured to an end of a rock shaft 139, which extends through an end of a swingable bracket 140, pivotally secured upon an end 141 of the bracket 133. Upon the other end of each shaft 139, a lever arm 142 is secured, the free ends of which are connected by a link 143. One of the lever arms 142 is provided with an upwardly extending member 144, in which is mounted a spring pressed plunger 145, which engages a catch member 146. The catch member 146 is provided with a catch notch 147. Plunger 145 will engage the member 146 in the notch 147 when the member 144 and lever arms 142 are rotated in a direction to release the pawls 135 and 136 from engagement with the ratchet wheel 134. The handle lever 29 has a knob 148 formed as a part of plunger 145, whereby the same will readily disengage the plunger 145 from the catch notch 147.

The swinging bracket 140 is provided with a downwardly extending part 149, on the lower end of which an elongated opening 150 is formed. A crank pin 151 is slidably secured to the part 149, and is adapted to move within the opening 150 thereof. The crank pin 151 is movable by means of a screw 152, one end of which is secured to the crank pin 151, and which extends upwardly and into a threaded opening in the part 153 of the bracket 140, and terminates in a squared end whereby it is adapted to receive a wrench or the like for rotating the same.

The crank pin 151 extends beyond the bracket part 149 into a groove 154, formed in the face of a crank 155, which is keyed to the outer end of a rock shaft 156. The shaft 156 extends through the frame 114 and has a lever 157 secured to the inner end thereof. One end of a connecting bar 158 is pivotally secured to the free end of the lever 157, and the other end thereof to an arm 159 secured to a vertically extending shaft 160, journaled in a bracket 161 upon the bed plate 14. A lever 162 secured to the shaft 160 is connected to the clutch lever 65. The shaft 160 extends upwardly, and handle 30 is secured to the upper end thereof in position to be readily reached by the operator upon platform D. Any swinging movement of the lever arm 159 will operate the rock shaft 156 and the clutch lever 65 to rock the pawls 135 and 136 about the ratchet wheel 134, in the former, and to stop or reverse the movement of the screw 62 in the latter instance, the clutch controlled by the lever 65 being of a type whereby forward, reverse and intermediate positions thereof are provided.

The operator, by means of the handle 30, may manually swing the lever arm 159 at any desired time to obtain these clutch movements. Automatic operation of the reverse mechanism is possible by setting stops 163 and 164 in proper position upon a rod 165, to which they are adjustably mounted. The rod 165 is supported between brackets 166 and 167, secured to the reciprocable carriage 21. By proper disposition of the stops 163 and 164 upon the rod 165, they will engage the end of the lever 159 at the completion of the predetermined movement of the carriage 21 in one direction, to cause the reverse rotation of screw 62 to move the carriage in the other direction.

When either of the stops 163 and 164 engages the end of the lever 159, shaft 156 is rocked through link 158, and lever 157. This movement of shaft 156 will rock the crank 155, which, due to the cooperation of the crank pin 151, in the groove 154 thereof, will rock the pawls 135 and 136 to rotate the ratchet wheel 134. As above described, any rotation of the ratchet wheel 134 will feed the grinding wheel 22 toward or away from the roll 10.

From the above description of the grinding machine illustrated in the drawings, and of the operation of the various mechanisms comprising the same, the operation of the machine is believed to be obvious. A roll 10 to be ground is supported between the centers 17 and 18. The grinding wheel 22 may be fed up into engagement with one end of the roll 10, either by power or manually, and the rotatable screw 62 given power to rotate it in one direction, it being understood that the cross head 58 is at the start generally in one or the other of its predetermined extreme positions. The rotation of screw 62, as above described, operates upon the bell crank 43, under the control of roller 68 and guides 69 and 70, to produce what may be termed a delayed crank movement thereof. This so-called delayed crank movement consists in first a straight movement, a swinging movement during an interruption in this straight movement, and then a straight movement in the same direction as the former. This movement is obtained by providing means which will delay, until a predetermined period in the movements of the parts, the effect of a combination of means that normally would cause a continuous crank action.

By the connections above described, the carriage 21 is moved for part of its stroke, then interrupted, while the subbase 20 is rotated through a predetermined arc, required to properly form the roll being ground, after which the carriage 21 is permitted to complete its movement in the same direction as before. The provision of the automatic feed for moving the grinding wheel toward the work, a predetermined amount permits the grinding of a roll automatically to a required diameter, the feed in of the wheel taking place when the same is at the end of the roll, inasmuch as the feed control means is operated by the movement of the carriage 21.

While we have shown and described a preferred embodiment of our invention, it is to be understood that the same is not limited thereto in all of the details shown, as many modifications and variations are possible which will lie within the spirit of the invention and the scope of the appended claims.

While the bell crank 43 is composed of arms 48 and 53, which in this instance, are cast or formed integrally into a one-piece structure, it is to be understood that we do not limit ourselves to a bell crank of such structure. Obviously, a bell crank may be formed by separate levers, such as 48 and 53, disposed at an angle to each other and connected together at one end of each, at which point interconnecting means, such as a shaft, could be provided, one end of which could form the pivot 42. The term bell crank is used broadly to define a combination of two lever arms disposed at an angle to each other, interconnected at an end of each, and which are adapted to pivot about a common pivot point disposed at the point of connection therebetween.

What we claim is:

1. A roll grinding machine comprising a grinding wheel, a work support adapted for sliding movement in a direction parallel with respect to the axis of said grinding wheel and being swingable relatively thereto, and means including mechanism to successively and in the same direction slide said work support, then swing it and then slide it.

2. In a grinding machine, a grinding wheel, work engaging means, means to effect a longitudinal movement of and to swing said work engaging means laterally with respect to the axis of said grinding wheel, and then to renew the longitudinal movement of said work engaging means including means to interrupt each of the aforesaid movements of said work engaging means before another one starts, and longitudinally movable means for driving said longitudinal and swinging movement means.

3. In a grinding machine, the combination of a bed plate, a carriage slidable thereon, a work support pivotally secured to said carriage, said carriage having a bell crank pivoted thereto, said work support being connected to one arm of said bell crank, means connected to the other arm of said bell crank, and tending to rotate said bell crank upon its pivot, and means to resist the rotatable urge of said last named means at predetermined intervals in the operation of said machine to cause a longitudinal movement of said carriage during such intervals, said first named means acting between such intervals to rotate said bell crank.

4. In a grinding machine, the combination of a bed plate, a carriage slidable thereon, a work support pivotally secured to said carriage, said carriage having a bell crank pivoted thereto, said work support being connected to one arm of said bell crank, means connected to the other arm of said bell crank, said means tending to rotate said bell crank upon its pivot, and means to resist the rotatable urge of said last named means to cause a longitudinal movement of said carriage, said last named means permitting said bell crank to rotate to swing said work support at a predetermined interval in the operation of said machine.

5. In a grinding machine, a grinding wheel, a work support adapted to reciprocate longitudinally with respect to the axis of said grinding wheel and to swing relatively thereto, a bell crank associated with said work support to move the same, means tending to rock said bell crank, and means controlling the movement of said bell crank whereby the movements of said work support are alternated.

6. In a grinding machine, a longitudinally slidable carriage having a work support pivotally connected thereto a grinding wheel, a bell crank pivoted to said carriage and having one of its arms connected to said work support, means to vary the effective radii of said work support and to vary the effective radii of the arm of said bell crank to vary the swinging movement of said support relatively to said carriage and means to swing said bell crank.

7. In a grinding machine, a longitudinally slidable carriage having a work support pivotally connected thereto, a grinding wheel, a bell crank pivoted to said carriage and having one of its arms connected to said wrok support, means associated with the other arm of said bell crank and adapted to rock the same, and means to vary the effective radii of said work support and to vary the effective radii of the first mentioned arm of said bell crank to vary the swinging movement of said support relatively to said carriage, and means to vary the effective radius of the last mentioned bell crank arm to vary the length of the effective arc described thereby.

8. A grinding machine, comprising a longitudinally slidable carriage having a work support pivotally connected thereto, a grinding wheel, means to slide said carriage and to swing said work support including a bell crank pivoted to said carriage and having one of its arms connected to said work support, means to vary the effective radii of said work support and to vary the effective radii of the arm of said bell crank to vary the swinging movement of said support relatively to said carriage, and longitudinally slidable means acting upon said bell crank to effect a sliding movement thereof to slide said carriage, and tending to rotate said bell crank to effect a swinging movement of said work support relatively to said carriage and means to alternately permit said bell crank to slide and to swing.

9. A roll grinding machine, comprising a longitudinally movable work supporting carriage, a transversely slidable grinding wheel support, work engaging means mounted upon said carriage and swingable angularly thereto, means to successively move said carriage longitudinally and to swing said work engaging means relatively to said carriage, and means operable by the longitudinal movement of said carriage to move said wheel transversely with respect to said carriage.

10. A roll grinding machine, comprising a longitudinally movable work supporting carriage, a transversely slidable grinding wheel support, work engaging means mounted upon said carriage and swingable angularly thereto, means to successively move said carriage longitudinally and to swing said work engaging means relatively to said carriage, means operable by the longitudinal movement of said carriage to move said wheel intermittently transversely with respect to said carriage, and means associated with said grinding wheel moving means to move said grinding wheel toward and away from said carriage by a continuous movement.

11. In a grinding machine, a grinding wheel in combination with a reciprocable carriage and a swingable work support, and means connected to said carriage and to said work support to cause the aforesaid movements thereof, including a crank arm pivoted to said carriage and having a reciprocable connecting rod secured thereto, and means to control the movement of said crank arm whereby during a portion of the movement of said connecting rod in one direction said carriage will move longitudinally with respect to the axis of said grinding wheel, and during another portion of the movement of said connecting rod, said work support will swing relatively to the axis of said grinding wheel.

12. In a grinding machine, the combination of a grinding wheel and a work support, said work support being mounted for reciprocating movement longitudinally with respect to and swinging movement laterally relatively to the axis of said grinding wheel, and means to effect the aforesaid movement of said work support comprising a crank arm, a reciprocable connecting rod operatively secured to said crank arm, connections between said crank arm and said work support, and control means for said crank arm whereby said arm will be retained against swinging movement during a portion of the reciprocating movement of said connecting rod and permitted to swing during another portion thereof to respectively slide and swing said work support.

13. The method of forming an irregular surface on the face of a roll, which consists in causng a relative movement between a roll and a rotary material removing means in a direction generally parallel to the axis of said means to form a straight surface on said roll, then causing a relative swinging movement between the roll and said means to form a curved surface upon said roll, and then causing a relative movement between said roll and said means in a direction generally parallel to the axis of said means to form another straight surface upon said roll.

14. In a grinding machine for grinding irregularly shaped rolls, a grinding wheel, means to rotate said grinding wheel, means to rotate a roll, means to cause a relative movement between said roll and said grinding wheel while the roll is being acted upon by the grinding wheel, including means to successively move one of them substantially parallel to the axis of the grinding wheel to form a straight surface upon said roll, to laterally swing one of them relatively to the other to form a curved surface upon said roll, and to cause a relative movement therebetween and parallel to the axis of said grinding wheel after the curved surface is formed upon the roll to form another straight surface thereon.

15. In a grinding machine having a rotary grinding wheel, means to form a roll having a curved surface intermediate its ends with a straight surface merging thereinto and at a tangent thereto at each end thereof upon the face of said roll, comprising means to successively move said roll generally parallel to the axis of said grinding wheel, swing said roll laterally with respect to said wheel, and again move said roll parallel to the axis of said wheel.

16. In a grinding machine having a rotary grinding wheel, means to form a roll having a curved surface with a straight surface merging thereinto and at a tangent thereto at an end thereof upon the face of said roll, comprising means to successively cause a relative movement between said roll and said grinding wheel generally parallel to the axis of one and a relative lateral swinging movement between the same.

17. In a grinding machine having a rotary grinding wheel, means to form a curved surface upon a roll intermediate its ends with a straight surface merging thereinto and at a tangent thereto at each end thereof, comprising means to successively cause a relative rectilinear movement between said roll and said grinding wheel, a relative lateral swinging movement between the same, and a further relative rectilinear movement.

18. In a roll grinding machine, a horizontally reciprocable part, a work holding part pivotally carried by said reciprocable part for swinging movement in a horizontal plane, an operable part connected to both said reciprocable part and said work holding part, means to control the action of said last named part whereby the reciprocation of the reciprocating part and the swinging of the work holding part will alternate, and means to operate said operable part.

19. In a roll grinding machine, a horizontally reciprocable carriage, a work support carried by said carriage and swingable in a horizontal plane relatively thereto, a member rockable in the horizontal plane connected to both said carriage and said work support, means to control the action of said member to alternately reciprocate said carriage and swing said work support, and means to operate said member.

20. In a grinding machine, a bed plate, a carriage slidable thereon, a work support pivotally secured to said carriage, a member pivoted to said carriage and connected to said work support, means connected to said member tending to rotate the same about its pivotal connection with said carriage, and means to retain said member against such rotation and to permit such rotation at successive intervals during the operation of the machine.

In witness whereof we have hereunto set our hands this 28th day of February, 1927.

CARL MOREY.
CARL F. SCHNUCK.